INVENTOR.
GEORGES NOTARI

3,294,242
FILTER ASSEMBLY HAVING FILTER ELEMENTS WITH INTEGRAL DISTRIBUTING AND SUPPORTING MEANS
Georges Notari, Monte Carlo, Monaco, assignor to Société des Poudres Metalliques et des Alliages Speciaux Ugine-Carbone, Paris, France, a corporation of France
Filed June 10, 1964, Ser. No. 373,950
Claims priority, application France, June 15, 1963, 938,258
10 Claims. (Cl. 210—347)

This invention relates to filter elements and to filters made from such elements, and more particularly to wide surface filter elements and filters which effect filtration of a fluid, especially a liquid, by flow of the liquid through the thickness of the elements.

Heretofore, it has been proposed to make wide surface filters from rigid filtering elements made from ceramic materials or metallic powders and to stack the elements one upon another with each element being separated from another by intermediary pieces or spacers. The shape of the filtering elements and of the intermediary pieces and their relative positions permit the product to be filtered, to be distributed over and around the elements, and the filtered product to be discharged through the thickness of the elements.

These elements are formed from two circular porous plates joined together by an external crown tightly connected to the plates and provided with a central orifice. Around this central orifice is an extra thickness on the outside surface of at least one element or an independent ring. Accordingly, when the elements are stacked upon one another, the interval or space between the elements is that required for distribution of the fluid to be filtered over all the filtering surfaces, and direct passage of the fluid towards the central orifice is prevented. The fluid filters through the thickness of the porous plates and passes into the interval between the plates of each element, and then into the central channel or orifice. Generally, a supporting body must be inserted between both plates of each element, especially when the working pressure is high. These supporting bodies may be independent of the plates, e.g., formed of wire gauze, of corrugated pieces, etc. It has also been proposed to provide the opposite faces of the plates with suitably distributed stubs; but such a way of supporting both plates spaced apart from each other requires a rather costly circular metallic piece between both plates and around the central orifice. Besides, it is difficult in assembly of an element to align the oppositely positioned stubs and thereby avoid the plates leaning on each other irregularly. Lastly, the peripheral zones of the elements stacked upon each other to form the filter are separated by an interval or space whose presence leads to deformation of the elements and even to breakage thereof when filtering liquids or when operating under a high pressure.

Such elements are suitable for wide surface filters which operate satisfactorily with reduced volumes of fluid to be filtered. However, the requirements for assembling the parts and components of the elements, and especially the spacers, and the cost of this assembling, render the obtained elements and the filters relatively expensive.

My invention relates to filters which use identical elements stacked upon one another and which are free from any intermediary piece or spacer.

The filtering element of the invention is a plane porous plate through the thickness of which the liquid to be filtered passes, and includes a central orifice which extends therethrough. On one face or side of the plate is a salient bearing which extends peripherally around the element and extends inwardly towards, but short of, the orifice. Also on this one side is a plurality of first ribs which are preferably salient and substantially rectilinear, which run from the peripheral bearing to the orifice, and at least some of which terminate substantially at the orifice. These first ribs are inclined and extend in a direction such that they angularly intersect planes disposed radially of the central axis of the orifice.

On the other face, or side, is a bearing similar to the former one, but disposed around the central orifice and extending outwardly towards, but short of, the periphery of the element. This other side has a plurality of second ribs similar to the former ones and which run from the central bearing to the periphery of the element and at least some of which terminate substantially at the periphery of the element. These second ribs are also inclined in a direction such that they angularly intersect planes disposed radially of the central axis of the orifice.

In one embodiment of my invention, the bearings and ribs have the same thickness, are made from the same material as the porous plate itself, and are molded together with the plate. However, they may be a piece cut out of a thin sheet of a porous or a non-porous material different from the porous material which forms the plate. The ribs may have any cross-section, provided that their higher or outer edge or surface is in a plane which includes the outer face of the bearing of the same side.

Some of the ribs which run from the central bearing do not reach or terminate at the periphery of the plate. Likewise, some of the ribs which run from the peripheral bearing of the plate do not reach or terminate at the orifice.

As the working pressures to which the elements are subjected are increased, the ribs are positioned closer to one another. Likewise, the thickness of the plates depends essentially on the working pressure, while taking into account the number of the ribs.

The material which forms the porous plates, as well as the bearings and the ribs when same are made of the same material as the plates and produced together with them, may be any of the materials generally used for making filters. For example, the material may be a ceramic or a sintered metal such as bronze, brass, stainless steel, carbon steel, Monel metal, Inconel metal, or more generally any metal or alloy likely to be obtained as a powdered metal and a sintered metal. If a sintered metal is chosen, it is converted to a powder of the desired granulation, poured either under a pressure or not under pressure into a mold of a type generally used for the metal in question, and then sintered to form the plate. This sintering is carried out either under a pressure or under no pressure and is effected in a suitable atmosphere, e.g., a reducing atmosphere. It is preferable to carefully adjust both faces of each element by machining or by mere calibrating.

The elements may have any shape, e.g., geometrical such as square, rectangular, circular, elliptical, and the shape may be adapted to any particular problem of filtration.

To make the filter of the invention, my identical elements are stacked one upon another without interposition of any intermediary pieces or spacers therebetween. The elements are arranged so that the peripheral and the central bearings of the successive elements alternately correspond. For example, the elements are aligned so that the orifice of each forms a passageway which runs through the filter. Then, a pair of the elements is disposed so that the peripheral bearings of the pair are opposite and in engagement with each other. A third element is located so that its central or orifice bearing is opposite and in engagement with the central bearing of one of the elements of the pair and a fourth element is similarly located so that its central bearing is opposite and in engagement with the central bearing of the other element of the pair. The remaining elements which comprise the filter are arranged in like manner. Thus is formed a pile in which each face of each element engages a great number of points of its neighboring element, i.e., through the bearings and the ribs, with some of the points being, due to the inclination of the ribs relative to the radial planes, distributed over the whole side of the element. Accordingly, a large number of ribs can be used.

If the liquid to be filtered is sent to the filter exteriorly of the pile, it finds its way to the filtering surfaces through passageways formed between the opposite faces of those elements which engage one another at their central bearings and their ribs to the filtering surfaces. Then, the liquid passes through the porous material of the plates. The filtered liquid exits from the porous material of each plate into the channels formed by ribs of the other side of the plates which sides are in engagement with corresponding sides of other elements through the central or orifice bearings and the ribs of the other sides, or exits into passageways formed by such ribs. From the channels or passageways, the filtered liquid flows to the central orifice. The liquid may also follow an inverse circuit, that is, be injected into the central orifices and exit through the channels which open at the periphery of the elements.

To maintain the elements assembled, a desired number of elements are disposed between two end plates whose faces opposite the filtering elements may be plane or provided with bearings and ribs similar to those of the face of the element which is placed opposite them. If the end plates are assembled with clamps, a rigid filter unit is formed which may be plunged into the liquid to be filtered or into a vessel which contains the liquid.

The filtering elements according to the invention and the filters formed from said elements have many advantages. In this regard, all the elements are identical and, if desired, may be obtained by molding. No machined piece is necessary for their assembly. The whole unit may be used substantially free from risk of breaking at very high pressures, e.g., at pressures of 200 kg./cm.$^2$, which are often used for filtering products of very high viscosity. Also, the filters can withstand high operating temperatures. For example, it is possible at 200° C. to work filters of sintered bronze made from elements according to the invention.

Furthermore, my filter provides a large amount of useful filtering surfaces for a reduced volume. For instance, for moderate working pressures, it has been possible to form a unit 60 cm. in height and 300 mm. in diameter, with a useful surface of about 10 m.$^2$. A filter plug of the same volume has a useful surface of only 0.5 m.$^2$.

In the accompanying drawings, I have shown a preferred embodiment of my invention, in which.

Figure 1:
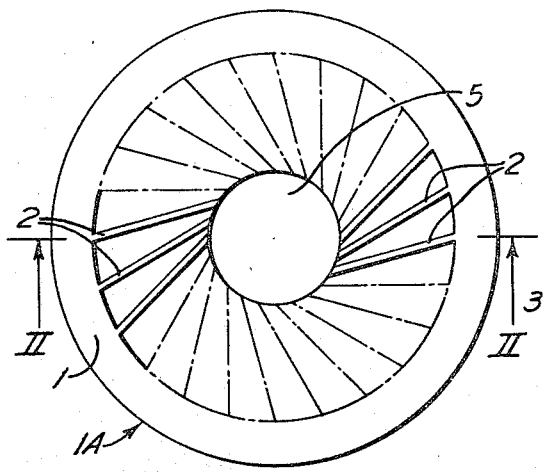
FIGURE 1 is a plan view of one side of a filter element of my invention.
Figure 3:
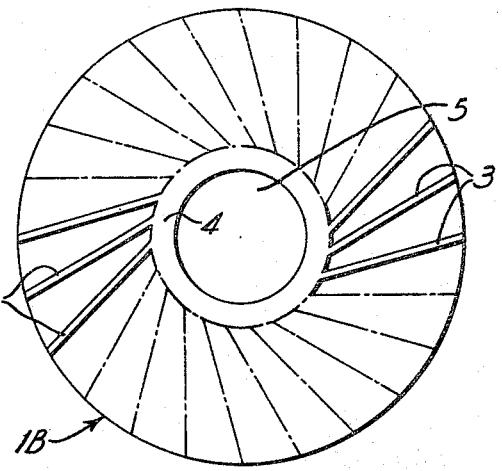
FIGURE 3 is a plan view of the other side of the element of FIGURE 1.
Figure 2:
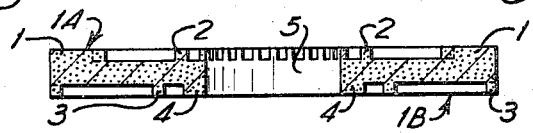
FIGURE 2 is a section view along the line II—II of FIGURE 1.

Referring to FIGURES 1–3, the filter element is a circular platelike disk with two oppositely disposed parallel sides which define its thickness. On the side 1A shown in FIGURE 1, it has a peripheral bearing 1 extending completely therearound and has a plurality of spaced apart rectilinear ribs 2 which run from the inner edge of the peripheral bearing 1 toward and terminate at a central orifice 5. FIGURE 2 shows that this orifice extends through the element.

The side 1B of the element illustrated by FIGURE 3 has a bearing 4 which extends completely around the orifice 5. This side also includes a plurality of spaced apart rectilinear ribs 3 which run from the inner edge of the bearing 4 to the periphery of the element and terminate at the periphery.

As shown by FIGURE 2, the outer edge or surface of each rib is in the plane of the outer or upper surface of the bearing of its side.

Each of the ribs is inclined in a direction such that each rib angularly intersects planes disposed radially of the central axis of the orifice 5 (FIGURES 1 and 3). Thus, the ribs extend in inclined positions defined by radii passing by one of their points.

Figure 4:
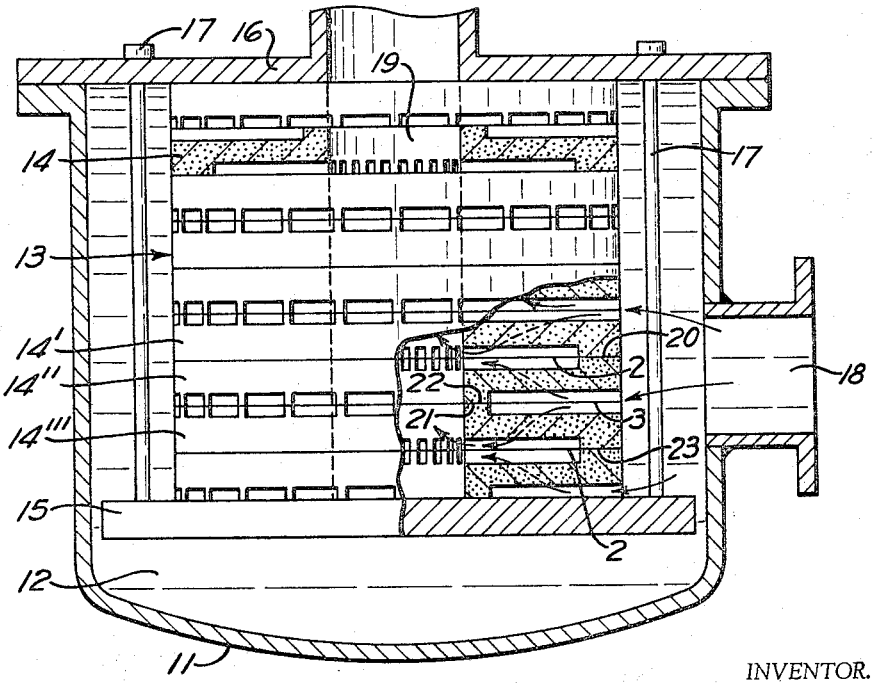
FIGURE 4 is an assembly view partly in section and partly broken away of a filter formed of elements identical to the elements of FIGURES 1–3, and showing the filter plunged into a liquid to be filtered.

In FIGURE 4, a vessel 11 is filled with a liquid 12 to be filtered and a filter 13 formed of a plurality of identical elements of FIGURES 1–3, such as 14 represented in cross-hatches, is placed in the vessel. Element 14′ has its central bearing face turned upward and its peripheral bearing face turned downward. Element 14″ has its peripheral bearing face 20 turned upward and its central bearing face 21 turned downward. Element 14‴ has its central bearing face 22 turned upward and its peripheral bearing face 23 turned downward. The filter elements 14 are so arranged relative to each other that ribs 2 of element 14″ are opposite to and engage ribs 2 of element 14′ along their lengths and ribs 3 of element 14″ are opposite to and engage ribs 3 of element 14‴ along their lengths. The other elements of the filter 13 are similarly arranged whereby the ribs on each side of each element engage the ribs on the next adjacent elements. At each end of the filter 13 are two end plates, one, 15, at the bottom, and the other, 16, at the top which also forms the lid of vessel 11. Clamps 17 ensure assembly and rigidity of the whole unit.

The liquid to be filtered enters the vessel 11 through a pipe 18 and fills the vessel 11. Flow of the liquid, shown by the arrows, is in through passageways formed by the ribs 3 which terminate at the periphery of the elements and then through the porous material of the elements 14″ and 14‴ to effect filtration. The filtrate exits from the porous material into the passageways between elements 14′ and 14″ and formed by the ribs 2, and then flows into a duct 19 formed by the central orifices of the elements. A circulation of the liquid in the reverse direction, namely, an entry into the duct 19 and an exit through the pipe 18 is also possible.

While I have shown and described a preferred embodiment of my invention, it may be otherwise embodied within the scope of the appended claims.

I claim:

1. A filter comprising a plurality of substantially identical elements, each element being made from a porous material and being substantially plate-like with two oppositely disposed sides defining the thickness thereof, each said element having a substantially central orifice extending therethrough, one of said two sides including a peripheral bearing member which extends inwardly from the periphery of said element towards but short of said orifice, the other of said two sides including a bearing member which extends peripherally around said orifice and extends outwardly from said orifice towards but short of the periphery of said element, one of said two sides including a plurality of spaced apart first ribs each of which runs from a location spaced inwardly from the periphery of said element towards said orifice and at least some of which terminate substantially at said orifice thereby forming passageways which have openings at said orifice and which terminate inwardly from said periphery, the other of said two sides including a plurality of spaced apart second ribs each of which runs from a location spaced inwardly from the periphery of said orifice towards the periphery of said element and at least some of which terminate substantially at the periphery of said element thereby forming passageways which have openings at said periphery and which terminate inwardly from said orifice, the upper surface of each of said first and second ribs being in the same plane as the outer face of the bearing member of its side, said first and second ribs extending and being inclined in directions such that they angularly intersect planes disposed radially of the central axis of said orifice, said elements being arranged substantially in alignment so that the orifice of each forms a central passageway through the filter and being further arranged so that the peripheral bearings of a pair are opposite and in engagement with one another, so that a third element has its orifice bearing opposite and in engagement with the orifice bearing of one element of said pair so that said ribs on each side of each element are opposite to and in engagement with said ribs on the next adjacent element along substantially the length of said ribs, and so that a fourth element has its orifice bearing opposite and in engagement with the orifice bearing of the other element of said pair.

2. The filter of claim 1 characterized by said bearings and said ribs of each element being made of a porous material.

3. The filter of claim 1 characterized by said first and second ribs extending substantially rectilinearly.

4. The filter of claim 1 characterized by said bearings and said ribs of each element having substantially the same thickness.

5. The filter of claim 1 characterized by said bearings and said ribs of each element being made of a porous material, by said first and second ribs extending substantially rectilinearly, and by said bearings and said ribs of each element having substantially the same thickness.

6. A filter comprising a plurality of substantially identical elements, each element being made from a porous material and being substantially plate-like with two oppositely disposed sides defining the thickness thereof, each said element having a substantially central orifice extending therethrough, one of said two sides including a peripheral bearing member which extends inwardly from the periphery of said element towards but short of said orifice, the other of said two sides including a bearing member which extends peripherally around said orifice and extends outwardly from said orifice towards but short of the periphery of said element, said one side including a plurality of spaced apart first ribs each of which runs from said peripheral bearing towards said orifice and at least some of which terminate substantially at said orifice thereby forming passageways which have openings at said orifice and which terminate inwardly from said periphery, the other of said two sides including a plurality of spaced apart second ribs each of which runs from said orifice bearing outwardly towards the periphery of said element and at least some of which terminate substantially at the periphery of said element thereby forming passageways which have openings at said periphery and which terminate inwardly from said orifice, the upper surface of each of said first and second ribs being in the same plane as the outer face of the bearing member of its side, said first and second ribs extending and being inclined in directions such that they angularly intersect planes disposed radially of the central axis of said orifice, said elements being arranged substantially in alignment so that the orifice of each forms a central passageway through the filter, and being further arranged so that the peripheral bearings of a pair are opposite and in engagement with one another, so that a third element has its orifice bearing opposite and in engagement with the orifice bearing of one element of said pair so that said ribs on each side of each element are opposite to and in engagement with said ribs on the next adjacent element along substantially the length of said ribs, and so that a fourth element has its orifice bearing opposite and in engagement with the orifice bearing of the other element of said pair.

7. The filter of claim 6 characterized by said bearings and said ribs of each element being made of a porous material.

8. The filter of claim 6 characterized by said first and second ribs extending substantially rectilinearly.

9. The filter of claim 6 characterized by said bearings and said ribs of each element having substantially the same thickness.

10. The filter of claim 6 characterized by said bearings and said ribs of each element being made of a porous material, by said first and second ribs extending substantially rectilinearly, and by said bearings and said ribs of each element having substantially the same thickness.

References Cited by the Examiner

UNITED STATES PATENTS

| | | | |
|---|---|---|---|
| 1,410,017 | 3/1922 | Kessler | 210—417 |
| 1,758,284 | 5/1930 | Gronning | 210—488 X |
| 2,408,130 | 9/1946 | Vokes et al. | 210—488 X |
| 2,905,326 | 9/1959 | Judson et al. | 210—457 |
| 3,195,730 | 7/1965 | Muller | 210—498 X |

REUBEN FRIEDMAN, *Primary Examiner.*

F. SPEAR, *Assistant Examiner.*